United States Patent
Williams et al.

(10) Patent No.: US 12,418,428 B2
(45) Date of Patent: Sep. 16, 2025

(54) EMBEDDED DEVICE AUTHENTICATION SYSTEM

(71) Applicant: Devvio, Inc., Albuquerque, NM (US)

(72) Inventors: Nicholas Williams, Albuquerque, NM (US); Thomas G Anderson, Albuquerque, NM (US)

(73) Assignee: Devvio, Inc., Albuquerque, NM (US)

( * ) Notice: Subject to any disclaimer, the term of this patent is extended or adjusted under 35 U.S.C. 154(b) by 376 days.

(21) Appl. No.: 18/324,802

(22) Filed: May 26, 2023

(65) Prior Publication Data

US 2023/0308291 A1 Sep. 28, 2023

Related U.S. Application Data

(63) Continuation of application No. PCT/US2021/062678, filed on Dec. 9, 2021.
(Continued)

(51) Int. Cl.
*H04L 9/00* (2022.01)
*H04L 9/08* (2006.01)
*H04L 9/32* (2006.01)

(52) U.S. Cl.
CPC .............. *H04L 9/50* (2022.05); *H04L 9/0866* (2013.01); *H04L 9/3236* (2013.01);
(Continued)

(58) Field of Classification Search
CPC ....... H04L 9/50; H04L 9/0866; H04L 9/3236; H04L 9/3247; H04L 9/3271; H04L 9/3297; H04L 2209/56; H04L 63/08; G06F 21/31
(Continued)

(56) References Cited

U.S. PATENT DOCUMENTS

2014/0366103 A1   12/2014   Etchegoyen et al.
2018/0255038 A1   9/2018    Smith et al.
(Continued)

FOREIGN PATENT DOCUMENTS

CN   107919962   4/2018

OTHER PUBLICATIONS

PCT/US21/62678 International Search Report, Feb. 25, 2022.
(Continued)

*Primary Examiner* — Tan Doan
(74) *Attorney, Agent, or Firm* — V Gerald Grafe

(57) ABSTRACT

Some embodiments of the present invention provide a method of cryptographically identifying and authenticating embedded devices through interaction with a distributed ledger. The device begins with a manufacturer root key and a globally unique identifier. It registers by signing a registration transaction that includes its identifier using its private root key with a digital signature algorithm and sending the resultant transaction to the distributed ledger. The ledger generates a registration root key and responds by sending this second root key back to the device. The device then uses the manufacturer root key and the registration root key to generate a child key that it uses to sign its response to the challenge proving that it possesses both the manufacturer key and the registration key. Thereafter, the device can non-interactively identify and authenticate itself to the distributed ledger by signing transactions with the derivative key.

21 Claims, 1 Drawing Sheet

Related U.S. Application Data

(60) Provisional application No. 63/123,434, filed on Dec. 9, 2020, provisional application No. 63/123,436, filed on Dec. 9, 2020.

(52) U.S. Cl.
CPC .......... *H04L 9/3247* (2013.01); *H04L 9/3271* (2013.01); *H04L 9/3297* (2013.01)

(58) Field of Classification Search
USPC ........................................................ 713/176
See application file for complete search history.

(56) References Cited

U.S. PATENT DOCUMENTS

| 2020/0211011 | A1 | 7/2020 | Anderson |
| 2020/0322131 | A1 | 10/2020 | Sundaresan et al. |
| 2021/0176052 | A1* | 6/2021 | Chen ................ H04L 9/321 |

OTHER PUBLICATIONS

Mohanty, PUFchain: Hardware-Assisted Blockchain for Sustainable Simultaneous Device and Data Security in the Internet of Everything (IoE). Sep. 17, 2019. retrieved Jan. 1, 2022]. Retrieved from the internet <URL: https://arxiv.org/pdf/1909.06496.pdf >, internet.

* cited by examiner

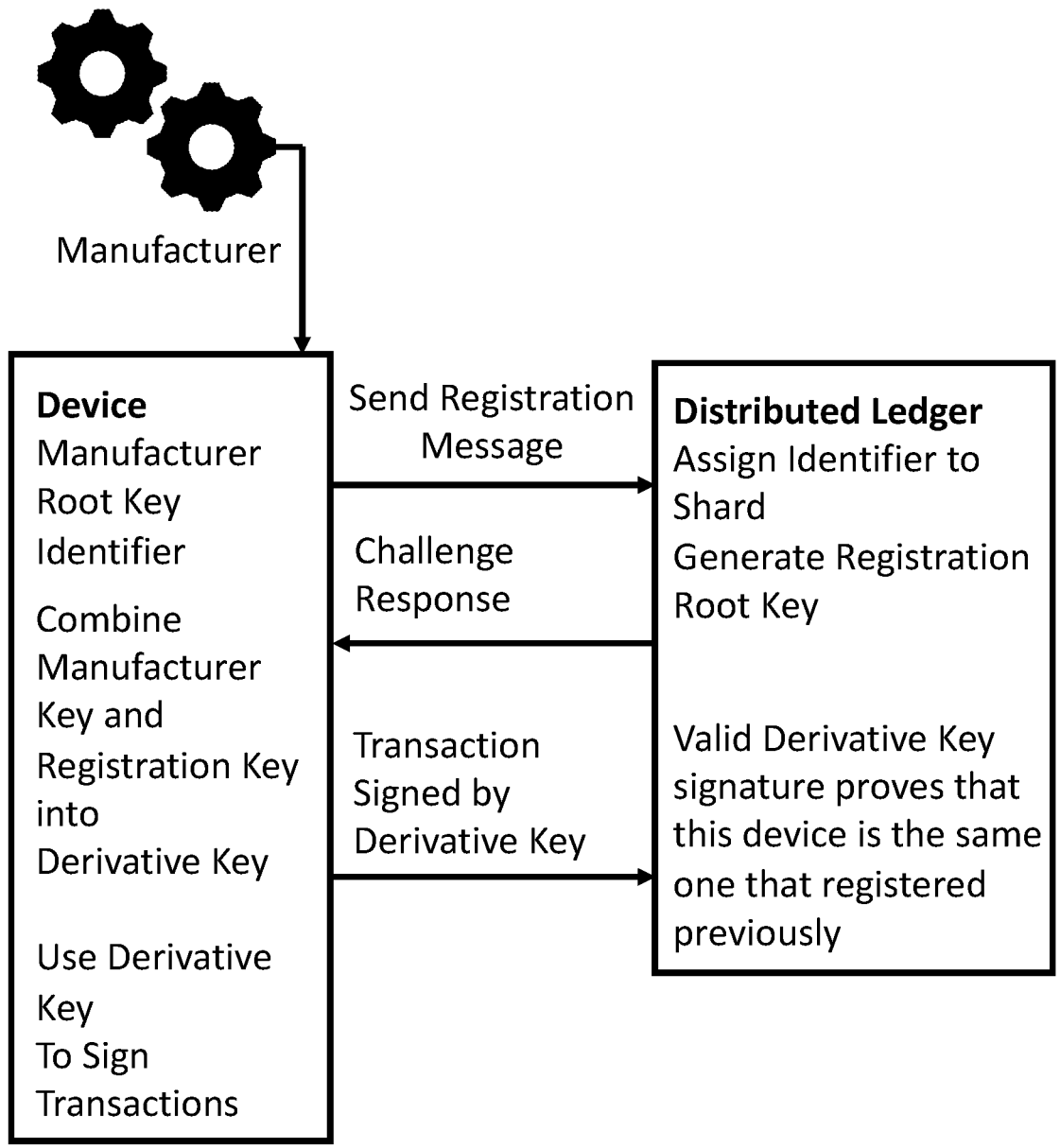

EMBEDDED DEVICE AUTHENTICATION SYSTEM

TECHNICAL FIELD

The present invention is related to the field of cybersecurity and authenticating embedded devices such as sensors, access control systems, and payment cards.

BACKGROUND ART

A cryptocurrency is a digital system used to implement and track financial transactions. Bitcoin is a widely known example of a cryptocurrency. Bitcoin uses decentralized control and blockchains to implement a distributed ledger. As of September 2017, over 1,000 cryptocurrency specifications exist. Many of them share various shortcomings that have surfaced as bitcoin has spread. Some of the shortcomings are summarized below.

Governance. Many cryptocurrencies have a governance model that is set at creation, and cannot be modified later due to the distributed nature of the system. This can prevent a cryptocurrency from adapting to new laws, regulations, or user needs.

Scalability. Many cryptocurrencies suffer from a limit on the rate at which transactions can be processed.

Time and energy requirements for mining. The proof-of-work model behind Bitcoin requires significant computing power, to the extent that the electrical power for bitcoin miners exceeds the energy usage of many small countries.

Expense of mining. New coin issuances in Bitcoin go to the miners themselves, currently about $9 million per day. The dollar amount available, plus the huge compute power requirements, lead to unexpected economic decisions where the price of electricity determines the mining effort, and the mining resources become increasingly concentrated in a decreasing number of high capacity miners.

A digital signature is a mathematical scheme for verifying the authenticity of a digital message using asymmetric cryptography.

SUMMARY OF INVENTION

The description at times might refer to aspects as "essential" or "most important" or "must include" or similar; those references are intended to highlight aspects for the reader's attention, and do not mean that the invention is limited to embodiments that include those aspects. The description also describes one or more example embodiments. Various alternative embodiments are contemplated, including example embodiments in which parameters described as varying can be set, or varied upon different events or timing; and in which parameters described as fixed in some example embodiments can be varied.

This application is related to U.S. provisional applications 63/123,434 filed Dec. 9, 2020, and 63/123,436 filed Dec. 9, 2020. Each of the foregoing is incorporated herein by reference. The inventions described herein can be practiced in cooperation with the technology disclosed in PCT applications PCT/US2018/053240, PCT/US2018/053242, and PCT/US2018/053243, each filed Sep. 27, 2018; and U.S. application Ser. No. 16/808,094, filed Mar. 12, 2020; each of which is incorporated herein by reference.

Example embodiments of the present invention provide methods of cryptographically identifying and authenticating embedded devices through interaction with a distributed ledger, and provide devices and apparatuses that implement or are compatible with such methods. An example device has a manufacturer root key and a globally unique identifier. The device registers itself by signing a registration transaction that includes its unique identifier using its manufacturer root key with a digital signature algorithm and sending the resultant transaction to a distributed ledger. The distributed ledger generates a registration root key and responds by sending this registration root key back to the device. The device then uses the manufacturer root key and the registration root key to generate a derivative key that it uses to sign its response to a challenge from the ledger or an authentication agent associated with the ledger, proving that it possesses both the manufacturer root key and the registration root key. Thereafter, the device can non-interactively identify and authenticate itself to the distributed ledger by signing transactions with the derivative key.

In some embodiments, the embedded device has only one processor.

In some embodiments, the embedded device uses a secure processor as a co-processor along with one or more other processors.

BRIEF DESCRIPTION OF THE DRAWINGS

FIG. 1 is a schematic illustration of an example embodiment of the present invention.

MODES OF CARRYING OUT THE INVENTION AND INDUSTRIAL APPLICABILITY

FIG. 1 is a schematic illustration of an example embodiment of the present invention. A Device is provided; examples of such devices includes financial devices such as credit cards or toll road passes, sensors, access control devices such as employee badges and keycards, tools such as drills and saws, or any other device that is desired to be uniquely identified. The Device is produced by or associated with a Manufacturer, who provides each Device with a digital identifier and the Manufacturer Root Key Identifier in the figure. The digital identifier on a Device can be unique from all other Devices, can be unique from all other Devices produced by that manufacturer, or can be common to some number of Devices while possibly unique from other Devices. The digital identifier can also identify the Manufacturer, for example by having a predetermined field of bits in the identifier to correspond to a specific Manufacturer, or by having predetermined range of identifier values associated with the Manufacturer.

Within the device, or accessible to the Device, is a subsystem that can communicate according to a predetermined protocol. The Device communicates with a registration agent, in the figure represented by a Distributed Ledger, by sending a Registration Message. In this scenario, "communicating with a registration agent" can include communicating with a processor accessing a distributed ledger, and can include communicating with an agent that can provide the services described below, where the agent is not itself a distributed ledger. The Registration Message indicates that the Device is seeking to be uniquely identified by the registration agent or distributed ledger. The registration agent responds to the Registration Message by sending a Registration Key to the Device. The registration agent can ensure that Registration Keys sent to different Devices are distinct from each other.

The Device, via a facility on the Device or accessible to the Device during the registration process, uses the Registration Key and the Manufacturer Root Key to determine a Derivative Key. As examples, the Derivative Key can be a combination formed by taking parts of each key and combining them, or can be a logical function or combination of the two keys, or any other method that results in a Derivative Key that requires both the Registration Key and the Manufacturer Root Key to form the Derivative Key. Note that a simple combination of key parts can be vulnerable to second pre-image attacks. A secure function for combining two parent keys into a derivative key preferably is collision resistant, meaning that the function produces a globally unique derivative key. Otherwise, the manufacturer or another observer might be able to calculate the derivative key by observing enough transaction signatures and then they could impersonate that device.

The Device then uses the Derivative Key to sign transactions to be recorded by the agent or the distributed ledger. The Derivative Key proves that the Device had access to both the Manufacturer Root Key and to the Registration Key, and thus establishes the unique identity of the Device. The Derivative Key can be thought of as an identifier that establishes that the Device had a specific starting state (the Manufacturer Root Key) and a unique experience or history (submitting Registration Message and receiving the Registration Key in the registration process).

The Manufacturer Root Key need not be transmitted in communications, so attempts to hijack Registration Keys will not allow duplication of the Derivative Key. The registration agent can ensure that Registration Keys are unique, e.g., by incorporating date and time in the key, or by simply keeping track of Registration Keys that have been used with given Device Registration Messages, so that an attempt to wrongly register a second Device with the same identity as the first Device will fail since, even if the Manufacturer Root Key were successfully duplicated, the Registration Key would be distinct. Likewise, even if the Registration Key were intercepted, the Derivative Key cannot be determined without also knowing the Manufacturer Root Key.

An example embodiment provides a method of distributed authentication of smart devices comprising: (a) providing a secure processor or co-processor embedded in the device with the capabilities to generate key pairs, sign binary data, and validated signed data using any well-defined digital signature algorithm; (b) providing or accessing a system of distributed ledgers partitioned into shards that can store and retrieve immutable data over public or private networks; (c) generating a manufacturer root key unique to that secure processor suitable for use with the chosen digital signature algorithm; (d) generating a registration message that uniquely identifies the device to the distributed ledger system; (e) providing a challenge response from the distributed ledger system that: (e) (i) Assigns the device to a single shard; and (ii) Provides the device with a registration root key; (f) generating a derivative key by combining the manufacturer root key and the registration root key; (g) cryptographically signing the challenge response using the derivative key and thereby proving that the secure processor possesses both the manufacturer root key and the registration root key.

In an example embodiment, the secure processor is the sole processor in a device. In an example embodiment, the secure processor is a co-processor in a device with other processors. In an example embodiment, the secure processor is located external to the device, e.g., in a device communications portal such as a credit card reader, and the device stores unique data and provides only enough functionality to identify and authenticate itself.

In an example embodiment, the device is a sensor. In an example embodiment, the device is a smartcard. In an example embodiment, the device is a biometric reader.

In an example embodiment, the device is used to facilitate financial payments. In an example embodiment, the device is used to identify a person, parcel, or asset.

In an example embodiment, the initial unique identification of the device is based on the manufacturer root key. In an example embodiment, the initial unique identification of the device is based on an independent number from the manufacturer root key such as a serial number, media access control address, account number, card number, or identification number.

In an example embodiment, the device can only register and generate a derivative key once. In an example embodiment, the device can be factory reset and then re-register for a new derivative key.

In an example embodiment, the device can store multiple derivative keys corresponding to multiple identities, contexts, or accounts based upon multiple registrations made either in parallel or in a hierarchy. In an example embodiment, the derivative key is generated within the same finite field as the root keys. In an example embodiment, the derivative key is generated on a distinct finite field from the root keys.

In an example embodiment, the device verifies a signature from the challenge response against a known whitelist of allowable public keys and indicates an error instead of running the derivative key generation process if this verification fails. In an example embodiment, the device verifies the signature from the challenge response against a known blacklist of disallowed public keys and indicates an error instead of running the derivative key generation process if this verification fails.

In an example embodiment, the manufacturer root key is permanently "burned" into the device during the manufacturing process. In an example embodiment, the manufacturer root key is externally generated by the manufacturer or a third-party in a manner appropriate for the chosen digital signing and verification process. In an example embodiment, the manufacturer root key is independently generated onboard the device itself. In an example embodiment, the manufacturer root key can be regenerated independently onboard the device through a factory reset process.

Example Embodiment—Financial Credential

In the case of a smartcard used to authenticate payments, such as a credit card or debit card, the Device can be the smartcard itself, which can contain a processor chip that has the capability to store the Manufacturer Root Key and the Derivative Key with single-use, read-often write-once memory.

A credential for financial transactions, e.g., a credit or debit card, can be produced with manufacturer key burned into the card at production. For example, the manufacturer key can be a 256-bit digital key that is unique to all such cards produced by the manufacturer. The card can have an embedded co-processor included with the card (for example, a Maxim Integrated DS2476 co-processor) or run as an application on a standard EMV chip card. Current manufacturers of suitable chip processors include Gemalto, Giesecke & Devrient, Morpho, Oberthur Technology, and Versatile Card Technology. Alternatively, the card can be configured to communicate with an external processor as described below.

Before the card is approved for use in authenticating transactions, the card can experience a registration process as described following. The card is presented to an agent that is authorized to register the card, e.g., a kiosk at a store. The registration process can be supported only at special locations, or can be supported as part of the services provided by terminals that process transactions using the card. Alternatively or additionally, the card can itself have communications capability such as wireless or cellular communications to allow the card to register itself with a network-accessible registration agent.

When the card is presented for registration, for example the first time it is used to certify a payment or as an initial registration process, the card generates a registration transaction that includes the card's unique identifier and digitally signs this transaction with its Manufacturer Root Key. The distributed ledger can optionally require a card activation step prior to registration where the cardholder notifies the card provider over the phone or Internet that they have received the card. When the card is activated, the card provider puts a transaction on the distributed ledger indicating that the card with the public key of the Manufacturer Root Key is ready to register. If this activation step is required and no activation transaction appears in the distributed ledger, the initial payment will be declined. Otherwise, the distributed ledger will validate the registration transaction and respond through the point-of-sale system with the Registration Key. Internally, the processor on the card will then calculate the Derivative Key by combining the Manufacturer Key and the Registration Key. Next, the card will use its on-board processor to sign the payment transaction provided by the point-of-sale system with the Derivative Key. The point-of-sale system will transmit the payment transaction and its signature to the distributed ledger. Once the ledger validates the payment transaction, it knows that the card has successfully determined and installed the Derivative Key and this key will be used to sign all future transactions certified by this card. Note that even if the point-of-sale system captures the Registration Key during this process it cannot determine the Derivative Key since it does not have any way to access the private portion of the Manufacturer Key.

As one example of how such a procedure can be implemented using common elliptical curve digital signature algorithms, the card can start with two values burned into the chip: (1) a 256-bit Manufacturer private key unique to this chip using a standard secp256k1 curve with an x-value based on a source of high entropy such as air turbulence sensors outside the factory and (2) a 256-bit globally unique identifier consisting of four parts: (2.1) a 64-bit Unix timestamp, (2.2) a 64-bit manufacturer ID assigned by the distributed ledger, (2.3) a 64-bit identifier for the facility where the chip was produced assigned by the digital ledger, and (2.4) a 64-bit high entropy random number that guarantees a Hamming distance of at least 3 bytes compared to any other chips produced around the same time at the same facility. High entropy can be gathered at scale using an entropy provisioning system based on airflow sensors around the factory, which can provide 256-bit chunks of random bytes after internally rejecting any chunks that have a Hamming distance less than 3 bytes when compared with all other chunks provided in the last hour. The secure processor interface can provide its globally unique identifier and the Manufacturer public key, which is calculated through scalar multiplication in the given prime field of the private key with the generator that defines the cyclic subgroup used for this key. In many applications, there should be no interface to provide the Manufacturer private key. Secondly, on the first use of the card, the point-of-sale system can provide a timestamp and the card processor can produce a registration transaction that contains the provided timestamp along with its globally unique identifier and an ECDSA signature using the Manufacturer Root Key over the hash of that transaction after encoding it with a standard algorithm such as SHA-256. Since the card is unlikely to have its own source of entropy and it should not trust the point-of-sale system, use the timestamp provided by the point-of-sale system as the random value (k) for the ECDSA signature algorithm. Since providing an arbitrary or false timestamp will change both the content of the transaction and the random coefficient used to calculate the signature, using a timestamp as a source of entropy will not provide the point-of-sale system with a method to calculate the key from the signature. The registration step can be run several times in case there is an issue unrelated to the card itself, such as a network connectivity issue. However, the card should have a procedure to automatically destroy itself by burning a code such as 8 high (0xFF) bytes into the on-board memory designated for its private Derivative Key in case the registration process restarts over a dozen times without a response from the distributed ledger. This will avoid a brute force attack or an attack using edge cases in the provided timestamp to try to determine the Manufacturer Root Key. Additionally, the processor can have logic to return an error in response to arbitrary timestamps such as any time before the card was manufactured or after its expiration date. In a normal situation, the point-of-sale system will receive a Registration Key in response to the card's registration transaction and provide that to the card processor to complete the registration process. The on-board card processor completes the registration process by calculating a derivative key and using that to sign the payment transaction. For example, the card could concatenate a constant byte like 0x43 with the private Manufacturer key and the private Registration Key and hash that bytestring using SHA-256. If the resulting 256-bit hash value is less than the base point of the cyclic subgroup (for secp256k1 this is the value 0xFFFFFFFFFFFFFFFFFFFFFFFFFFFFFFFEBAAEDCE6AF48A03BBFD25E8CD0364141 in little endian notation), then this is the derivative key. If the value is larger than the base point for the curve, the card processor can use modulo division against the base point to calculate a new value that is guaranteed to be less than the base point. Once this derivative key is determined, the card should burn it into local memory for use with transactions. Finally, the point-of-sale system can also provide a payment transaction and a timestamp that the card processor will use to sign the transaction with the new derivative key. If the derivative key is not set or is set to an invalid value, the card processor will return a card malfunction error. If the timestamp provided by the point-of-sale system is not also included verbatim in the transaction itself or the timestamp is before the card manufacture time or after the card expiration time, the card will return a transaction syntax error. These checks can help avoid attacks on the signature process. Once a card is registered, the registration function can be locked or disabled. For the rest of the lifecycle of this card, it can just use the derivative key to sign any valid payment transactions sent to it. Any other contextual checks based on the presence of this card such as existing balances, location, purchasing behavior, or other indicators can be handled by the payment processor to determine whether to ultimately approve or deny the transaction for the point-of-sale system. An invalid signature on the payment transaction can always cause the payment processor to reject or decline the transaction.

During the majority of its lifecycle the card is used to authenticate transactions, the point-of-sale system provides a timestamp and a binary transaction, which the card signs with the Derivative Key if the transaction and timestamp are within valid ranges. The same process can be used not only for payment transactions, but also as one factor to identify a cardholder or provide access to a secure space, such as a hotel room. Such a card can also be used for logistics or toll payments by adhering it to a vehicle and using RFID as a means to transmit the transactions.

Current security challenges in the supply of devices such as smartcards include manufacturers secretly storing the initial keys or organizations interdicting devices during shipment to modify them or steal the initial keys. Conversely, if a device has no initial key and is assigned one over a network, a man in the middle might observe the key and steal it. Embodiments of the present invention can address both of these challenges by generating a child derivative key when the device is first registered or used. This process is more secure than current public key infrastructure standards, because the initial key used to generate a certificate signing request might be known by the manufacturer or an agent who intercepted the device before it was delivered to the intended user. In order to fraudulently impersonate the card that is supported with this system, an adversary must obtain both the manufacturer key and the registration key to calculate the derivative key that is actually used. If the manufacturer or another party copies the Manufacturer Root Key, they could register the device falsely, but then the real device will fail to register. Once the actual device is registered, this party would not be able to determine its derivative key and impersonate it. Conversely, if a malicious party controls the registration process by hacking a point-of-sale system for example, they could provide a false timestamp within range and store the registration key provided by the distributed ledger, but this would not provide a way to calculate the private derivative key. Even storing the registration key and subsequently hitting the card with arbitrary transaction requests still would not yield the private key because the random value used as a coefficient to sign the transaction must also be used to modify the message digest of the transaction to be signed. This means that an adversary in control of a card reader will not be able to fix and pivot on a variable such as the signature coefficient and will be unable to determine the underlying private derivative key.

Example—Embedded Sensor

In an example embodiment of an embedded sensor used to collect environmental data, the Device is the sensor itself, which can contain a processor and has the capability to store the Manufacturer Root Key and the Derivative Key with single-use, write-once memory. The sensor can be delivered from the manufacturer with a seal. When the sensor is first unsealed and connected to the local network, it can request a timestamp and register itself as described in above. If a registration already exists for that Manufacturer Root Key, the owner can be notified that someone might have tampered with their sensor prior to them receiving it. Otherwise, once the sensor has registered and determined its derivative key, it can periodically generate transactions as envelopes around the environmental data it is detecting and then sign these transactions and transmit them over the network to be stored, recorded, and analyzed.

If the registration process completes without errors, the owner of an embedded sensor can be confident that this sensor cannot be easily spoofed by other parties. If the manufacturer copied the Manufacturer Root Key and attempts to use it after the real sensor has registered, this will fail and be detected by the distributed ledger since that key was already registered. If the manufacturer does this before the real sensor registers, then it might appear to work, but the real sensor will fail its registration when it comes online. Either way, the manufacturer cannot spoof the sensor data undetected. On the other hand, if a malicious contractor or some agent embedded in the facility records the registration process, they could obtain the registration key, but without the manufacturer's key this party will have no way to calculate the private Derivative Key that they would need to spoof the authentic sensor data.

Example—Secure Appliance

Organizations that wish to maintain security over information networks often do so with appliances such as intrusion detection systems, firewalls, and network encryption devices. These appliances tend to have secure modules such as cryptographic co-processors that handle sensitive computations such as encryption and decryption. By extending those co-processor instruction sets to support the interface described in this document and registering their appliances on a distributed ledger, organizations can have more confidence that the secure modules they are purchasing have not been tampered with since that would break the registration process. In order to spoof an appliance without detection, an adversary would have to both intercept the appliance from the supply chain and monitor the registration process as it happens over the organization's network. Note that the appliance itself could encrypt its registration data with transport layer security protocols, so observing network traffic or chain data on the distributed ledger would not be enough to calculate the derivative key even if this adversary had already acquired the Manufacturer Root Key through some means.

Implementation. Methods and apparatuses according to the present invention can be implemented using multiple computers connected in a distributed network. Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of a special-purpose computer, programmable data processing apparatus, processor, processor architecture, and so on.

It will be understood that a computer can include a computer-readable storage medium and that this medium can be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the systems as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

According to an embodiment of the present invention, a data store can be comprised of one or more of a database, file storage system, relational data storage system or any other data system or structure configured to store data, preferably in a relational manner. In an embodiment of the present invention, the data store can be a relational database, working in conjunction with a relational database management system (RDBMS) for receiving, processing and storing data. In an embodiment, the data store can comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

The elements depicted in any flowchart illustrations and block diagrams in the figures imply logical boundaries between the elements. However, according to software or hardware engineering practices, the depicted elements and the functions thereof can be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of any block diagrams and flowchart illustrations support combinations of means for performing the specified functions, combinations of steps for performing the specified functions, program instruction means for performing the specified functions, and so on.

It will be appreciated that computer program instructions can include computer executable code. A variety of languages for expressing computer program instructions are possible, including without limitation C, C++, Java, JavaScript, assembly language, Lisp, HTML, Perl, and so on. Such languages can include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads can be processed more or less simultaneously to enhance utilization of the processor and to facilitate substantially simultaneous functions. By way of implementation, any and all methods, program codes, program instructions, and the like described herein can be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. It is possible to modify or customize general-purpose systems to be used with programs in accordance with the teachings herein, or it might prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages can be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware specialized through computer instructions; and so on—any and all of which can be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations can depict a step, or group of steps, of a computer-implemented method. Further, each step can contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described can be utilized and presented in a multitude of languages. Individual systems can be presented in one or more languages and the language can be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

We claim:

1. A method of distributed authentication of smart devices comprising:
    (a) providing a secure processor or co-processor embedded in the device with the capabilities to generate key pairs, sign binary data, and validated signed data using any well-defined digital signature algorithm;
    (b) providing a system of distributed ledgers partitioned into shards that can store and retrieve immutable data over public or private networks;
    (c) generating a manufacturer root key unique to the processor or co-processor suitable for use with the chosen digital signature algorithm;
    (d) generating a registration message that uniquely identifies the device to the distributed ledger system;
    (e) providing a challenge response from the distributed ledger system that:
    (e) (i) assigning the device to a single shard;
    (e) (ii) providing the device with a registration root key
    (f) generating a derivative key by combining the manufacturer root key and the registration root key;
    (g) cryptographically signing the challenge response using the derivative key and thereby proving that the secure processor possesses both the manufacturer root key and the registration root key.

2. The method of claim 1, wherein the secure processor is the sole processor in a device.

3. The method of claim 1, wherein the secure processor is a co-processor in a device with other processors.

4. The method of claim 1, wherein the device is a sensor.

5. The method of claim 1, wherein the device is a smartcard.

6. The method of claim 1, wherein the device is a biometric reader.

7. The method of claim 1, wherein the device is used to facilitate financial payments.

8. The method of claim 1, wherein the device is used to identify a person, parcel, or asset.

9. The method of claim 1, wherein the initial unique identification of the device is based on the manufacturer root key.

10. The method of claim 1, wherein the initial unique identification of the device is based on an independent number from the manufacturer root key such as a serial number, media access control address, account number, card number, or identification number.

11. The method of claim 1, wherein the device can only register and generate a derivative key once.

12. The method of claim 1, wherein the device can be factory reset and then re-register for a new derivative key.

13. The method of claim 1, wherein the device can store multiple derivative keys corresponding to multiple identities, contexts, or accounts based upon multiple registrations made either in parallel or in a hierarchy.

14. The method of claim 1, wherein the derivative key is generated within the same finite field as the root keys.

15. The method of claim 1, wherein the derivative key is generated on a distinct finite field from the root keys.

16. The method of claim 1, wherein the device verifies a signature from the challenge response against a known whitelist of allowable public addresses and indicates an error instead of running the derivative key generation process if this verification fails.

17. The method of claim 1, wherein the manufacturer root key is permanently burned into the device during the manufacturing process.

18. The method of claim 1, wherein the manufacturer root key is externally generated by the manufacturer or a third-party in a manner appropriate for the chosen digital signing and verification process.

19. The method of claim 1, wherein the manufacturer root key is independently generated onboard the device itself.

20. The method of claim 1, wherein the manufacturer root key can be regenerated independently onboard the device through a factory reset process.

21. An apparatus comprising one or more processors, and a computer-readable hardware storage device readable by the one or more processors, where the computer-readable hardware storage device has instructions therein such that, when executed by the one or more processors, the instructions cause the one or more processors to implement the method of claim 1.

* * * * *